United States Patent
Shaharabany et al.

(10) Patent No.: US 9,990,145 B2
(45) Date of Patent: Jun. 5, 2018

(54) MEMORY SYSTEM AND METHOD FOR INCREASING READ PARALLELISM OF TRANSLATION PAGES

(71) Applicant: SanDisk Technologies Inc., Plano, TX (US)

(72) Inventors: Amir Shaharabany, Kochav Yair (IL); Hadas Oshinsky, Kfar Saba (IL)

(73) Assignee: SanDisk Technologies LLC, Plano, TX (US)

( * ) Notice: Subject to any disclaimer, the term of this patent is extended or adjusted under 35 U.S.C. 154(b) by 0 days. days.

(21) Appl. No.: 14/883,143

(22) Filed: Oct. 14, 2015

(65) Prior Publication Data

US 2017/0109078 A1   Apr. 20, 2017

(51) Int. Cl.
*G06F 12/00* (2006.01)
*G06F 3/06* (2006.01)
*G06F 12/1009* (2016.01)

(52) U.S. Cl.
CPC .......... *G06F 3/0613* (2013.01); *G06F 3/0659* (2013.01); *G06F 3/0688* (2013.01); *G06F 12/1009* (2013.01); *G06F 2212/1016* (2013.01); *G06F 2212/202* (2013.01); *G06F 2212/65* (2013.01)

(58) Field of Classification Search
CPC .... G06F 3/0613; G06F 3/0659; G06F 3/0688; G06F 12/1009; G06F 2212/1016; G06F 2212/2022; G06F 2212/65
See application file for complete search history.

(56) References Cited

U.S. PATENT DOCUMENTS

| | | | | |
|---|---|---|---|---|
| 8,301,832 B1* | 10/2012 | Moore | .................... | G06F 3/061 711/103 |
| 8,375,174 B1* | 2/2013 | Cartmell | ............. | G06F 12/0692 711/147 |
| 8,819,337 B1* | 8/2014 | Oshinsky | ............ | G06F 11/1441 365/185.07 |
| 2008/0140945 A1* | 6/2008 | Salessi | .................... | G06F 3/061 711/148 |
| 2016/0062679 A1* | 3/2016 | Samuels | ................ | G06F 3/0616 711/103 |
| 2017/0068470 A1* | 3/2017 | Ravimohan | ........... | G06F 3/0619 |
| 2017/0102879 A1* | 4/2017 | Benisty | ................. | G06F 3/0604 |

* cited by examiner

Primary Examiner — Matthew Bradley
(74) Attorney, Agent, or Firm — Brinks Gilson & Lione

(57) ABSTRACT

A memory system and method are provided for increasing read parallelism of translation pages. In one embodiment, a memory system is provided comprising a plurality of memory dies, where each memory die is configured with storage space for a portion of a logical-to-physical address map that is distributed among the plurality of memory dies. The memory system also comprises a controller in communication with the plurality of memory dies and configured to receive a plurality of requests to read a plurality of logical block addresses, determine which memory dies store portions of the logical-to-physical address map that contain the logical block addresses, and determine an order in which to read the portions of the logical-to-physical address map so that at least some of the portions that are stored in different memory dies are read in parallel. Other embodiments are provided.

14 Claims, 7 Drawing Sheets

| Index | LBA | Translation Page = LBA / 0x8000 | Translation Page die location = Translation Page / 4 reminder | Optimized Execution order |
|---|---|---|---|---|
| 1 | 0x5324 | 0 | 0 | 1 |
| 2 | 0x22562 | 4 | 0 | 5 |
| 3 | 0x18651 | 3 | 3 | 2 |
| 4 | 0x48692 | 9 | 1 | 3 |
| 5 | 0x38954 | 7 | 3 | 6 |
| 6 | 0x92456 | 12 | 0 | 7 |
| 7 | 0x33030 | 6 | 2 | 4 |

Figure 6

MEMORY SYSTEM AND METHOD FOR INCREASING READ PARALLELISM OF TRANSLATION PAGES

BACKGROUND

Some memory systems, such as solid-state drives (SSDs), contain volatile memory (such as RAM) and a non-volatile memory comprising a plurality of memory dies that can be read or written in parallel. In some memory systems, the non-volatile memory contains physical addresses, while requests to read or write contain logical addresses. The non-volatile memory can contain a logical-to-physical address map that the memory system can use to map the logical address in the request to a corresponding physical address in the memory. In some memory systems, the logical-to-physical address map is stored in the non-volatile memory. In operation, the memory system reads the logical-to-physical address map from the non-volatile memory and stores it in the volatile memory, as reading from the volatile memory is faster and, hence, provides better performance. However, in memory systems with many memory dies, the size of the logical-to-physical address map can be relatively large (e.g., 32 MB) and may not be able to be stored in its entirety in the volatile memory due to resource limitations. In such memory systems, the logical-to-physical address map can be distributed among the memory dies, where each memory die contains a portion (a "translation page") of the logical-to-physical address map. The translation of a given logical address is done by reading the relevant translation page from the non-volatile memory into volatile memory. Some memory systems rely on a statistical self-balancing technique to use a random pattern to help spread translation pages among the memory dies. Other memory systems use a memory management layer (MML) to help spread data and management information among the memory dies.

BRIEF DESCRIPTION OF THE DRAWINGS

FIG. 6 is a chart illustrating results of a method of an embodiment for increasing read parallelism of translations pages.

DETAILED DESCRIPTION

Figure 1:
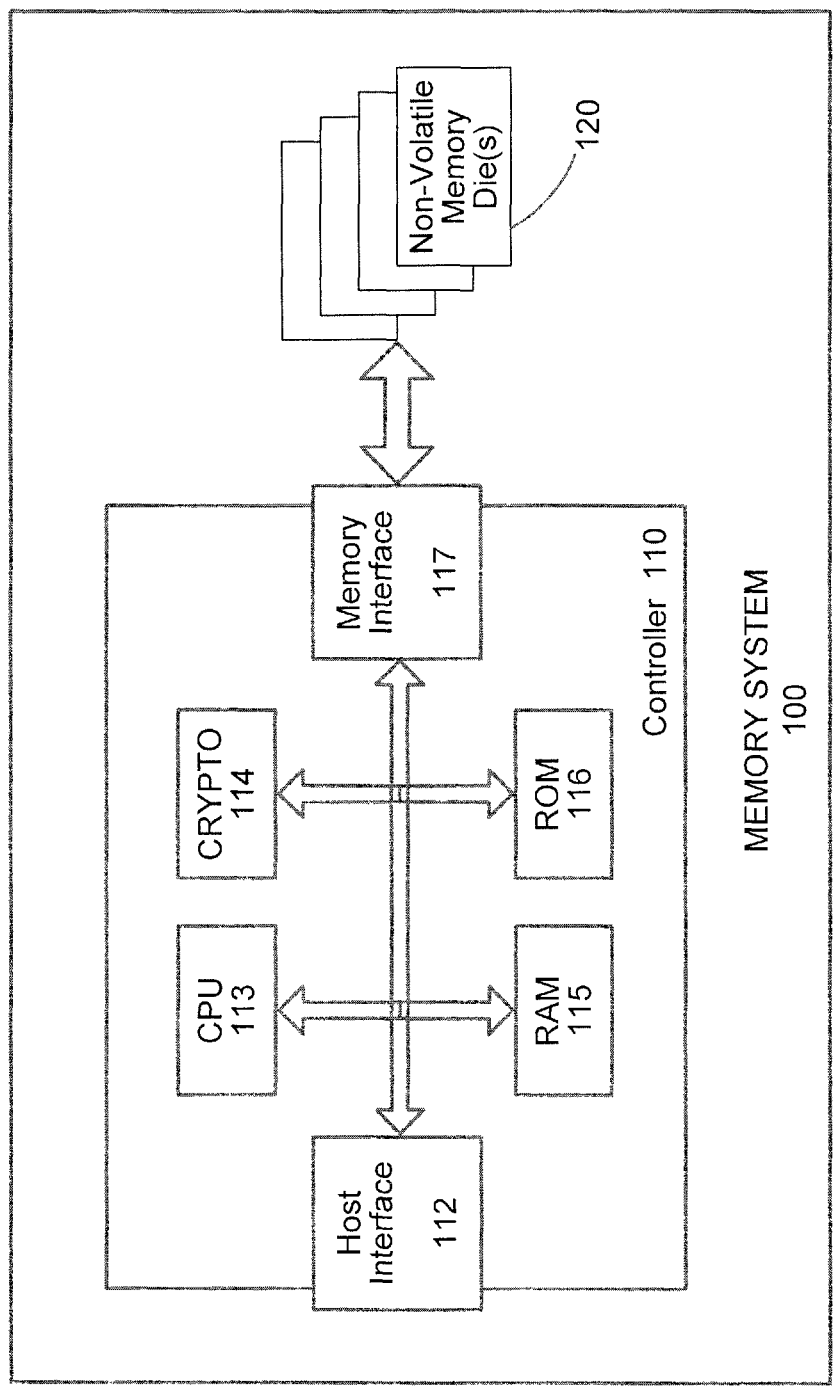
FIG. 1 is a block diagram of an exemplary memory system of an embodiment.

By way of introduction, the below embodiments relate to a memory system and method for increasing read parallelism of translation pages. In one embodiment, a memory system is provided comprising a plurality of memory dies, where each memory die is configured with storage space for a portion of a logical-to-physical address map that is distributed among the plurality of memory dies. The memory system also comprises a controller in communication with the plurality of memory dies and configured to receive a plurality of requests to read a plurality of logical block addresses, determine which memory dies store portions of the logical-to-physical address map that contain the logical block addresses, and determine an order in which to read the portions of the logical-to-physical address map so that at least some of the portions that are stored in different memory dies are read in parallel.

In some embodiments, the controller is configured to determine which memory die stores a portion of the logical-to-physical address map that contains the logical block address by dividing the logical block address by a size of a portion of the logical-to-physical address map and then dividing that quotient by a total number of memory dies in the plurality of memory dies, wherein a resulting remainder is a number of the memory die that stores the portion of the logical-to-physical address map that contains the logical block address.

In some embodiments, the memory system further comprises volatile memory, and the controller is further configured to read the portions of the logical-to-physical address map in the determined order and store the portion in the volatile memory.

In some embodiments, the controller is further configured to store the plurality of requests in a load container, and on a request-by-request basis, determine which memory die stores a portion of the logical-to-physical address map containing the logical block address in the request, and add the request to an execution queue.

In another embodiment, a method for increasing read parallelism of translations pages is provided that is performed in a memory system having a plurality of memory dies, wherein each memory die stores a translation page for logical addresses. The memory system receives a plurality of requests to read a plurality of logical block addresses, determines which memory dies store translation pages containing the logical block addresses, and determines an order in which to read the translation pages so that at least some of the translation pages that are stored in different memory dies are read in parallel.

In some embodiments, determining which memory die stores the translation page comprises dividing the logical block address by a size of the translation page and then dividing that quotient by a total number of memory dies in the plurality of memory dies, wherein a resulting remainder is a number of the memory die that stores the translation page that contains the logical block address.

In some embodiments, the memory system further comprises volatile memory, and the method further comprises reading the translation pages in the determined order and storing the translation pages in the volatile memory.

In some embodiments, the method further comprises storing the plurality of requests in a load container, and on a request-by-request basis, determining which memory die stores a translation page containing the logical block address in the request, and adding the request to an execution queue.

In yet another embodiment, a method for determining a location of a translation page is provided. In this embodiment, the method is performed in a memory system having a plurality of memory dies. In this method, a request to read a logical block address is received. The memory system then determine which memory die stores a translation page containing the logical block address in the request by dividing the logical block address by a size of the translation page and dividing that quotient by a total number of memory dies in the plurality of memory dies, wherein a resulting remainder is a number of the memory die that stores the translation page that contains the logical block address.

In some embodiments, the memory is a three-dimensional memory.

In some embodiments, the memory system is embedded in a host, while, in other embodiments, the memory system is removably connected to a host.

Other embodiments are possible, and each of the embodiments can be used alone or together in combination.

As mentioned above, these embodiments generally relate to a memory system and method for increasing read parallelism of translation pages. Before turning to several examples, the follow paragraphs present an exemplary memory system that can be used with these embodiments.

Turning now to the drawings, FIG. 1 is a block diagram of a memory system 100 of an embodiment. As shown in FIG. 1, the memory system 100 of this embodiment comprises a controller 110 in communication with a plurality of memory dies 120. As used herein, the phrase "in communication with" could mean directly in communication with or indirectly in communication with through one or more components, which may or may not be shown or described herein.

In general, the controller 110 transmits command sequences for read, program, and erase operations to the plurality of memory dies 120, and performs other functions, as will be discussed below. The controller 110 can be implemented in any suitable manner. For example, the controller 110 can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 110 can be configured with hardware and/or firmware to perform the various functions described below and shown in the flow diagrams. Also, some of the components shown as being internal to the controller 110 can also be stored external to the controller 110, and other components can be used.

As mentioned above, in this embodiment, the memory takes the form of a plurality of memory dies 120. As used herein, the term "die" refers to the collection of non-volatile memory cells, and associated circuitry for managing the physical operation of those non-volatile memory cells, that are formed on a single semiconductor substrate. A memory die may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

As shown in FIG. 1, in one embodiment, the memory system's controller 110 comprises a host interface (or host interface module (HIM)) 112, a memory (or backend) interface 117, random access memory (RAM) 115, read only memory (ROM) 116 (e.g., to store system boot code), a central processing unit (CPU) (or "processor"), and a crypto-engine 114 to provide encryption and/or decryption operations. Of course, other or different components can be used. For example, the controller 100 can contain an error correction controller (ECC) engine to encode/decode data written to and read from the plurality of memory dies 120. The host interface 112 can take any suitable form, such as, but are not limited to, a SATA, SATA Express, SAS, Fibre Channel, USB, PCIe, and NVMe interface. The memory interface 117 can also take any suitable form, such as, but not limited to, a flash interface (e.g., Toggle Mode 200, 400, or 800).

In operation, the CPU 113 can read computer-readable program code (e.g., stored in ROM 116, RAM 115, or the memory 120) and execute that code to perform several functions, such as those discussed below and illustrated in the flow charts. More generally, the controller 110 can contain "circuitry" configured to perform various operations. As used herein, the term "circuitry" can refer to an instruction processor, such as a Central Processing Unit (CPU), microcontroller, or a microprocessor; or an Application Specific Integrated Circuit (ASIC), Programmable Logic Device (PLD), or Field Programmable Gate Array (FPGA); or a collection of discrete logic or other circuit components, including analog circuit components, digital circuit components or both; or any combination thereof. Circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, "circuitry" may store or access instructions for execution or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs and part of a library, such as a shared library like a Dynamic Link Library (DLL). The library, for example, may contain shared data and one or more shared programs that include instructions that perform any of the processing described above or illustrated in the drawings, when executed by the circuitry. Accordingly, "circuitry" may be implemented in many different ways and in many different combinations of hardware and software.

The memory system 100 can take any suitable form. For example, the memory system 100 can be a removable mass storage device, such as, but not limited to, a handheld, removable memory device, such as a memory card (e.g., a Secure Digital (SD) card, a micro Secure Digital (micro-SD) card, or a MultiMedia Card (MMC)), or a universal serial bus (USB) device. The memory system 100 can also take the form of an embedded mass storage device, such as an eSD/eMMC embedded flash drive or an embedded or removable solid state drive (SSD) (e.g., client SSDs found in portable computing devices (such as laptop computers and tablet computers) and enterprise SSDs).

Figure 2A:
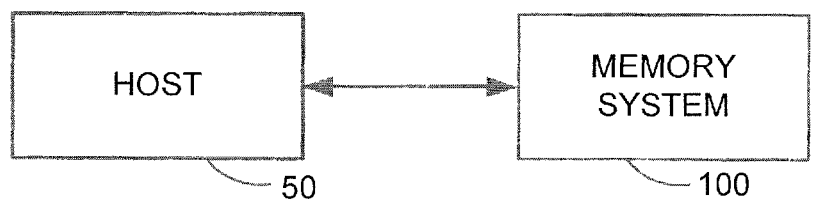
FIG. 2A is a block diagram of a memory system of an embodiment removably connected to a host.
Figure 2B:
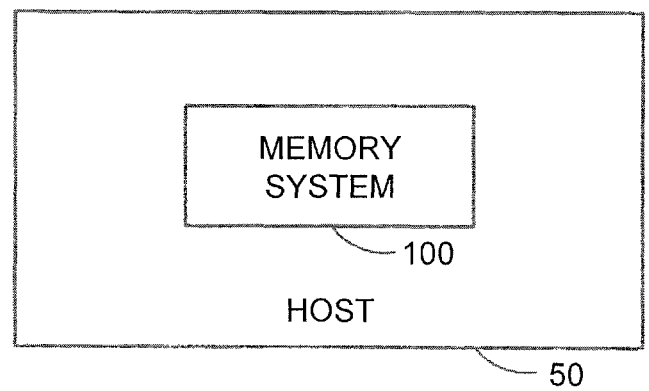
FIG. 2B is a block diagram of a memory system of an embodiment embedded in a host.

As shown in FIG. 2A, in some embodiments, the memory system 100 is removably connected to a host 50 (e.g., where the host 50 and memory system 100 can each have mating physical connectors that allow the memory system 100 to be removably connected to the host 50). In other embodiments (shown in FIG. 2B), the memory system 100 is embedded in a host 50 (FIG. 2B).

A host can take any suitable form. A host 50 typically has a controller and an interface for communicating with the memory system 100. In some implementations, the host 50 has a crypto-engine operative to provide encryption and/or decryption operations for communication with the memory system 100 (e.g., for mutual authentication, key exchange, and establishment of a secure channel). The host 50 can contain other components (e.g., a display device, a speaker, a headphone jack, a video output connection, etc.). Examples of hosts 50 include, but are not limited to, a mobile phone, a digital media player, a game device, a personal digital assistant (PDA), a personal computer (PC), a kiosk, a set-top box, a TV system, a book reader, or any combination thereof.

In one embodiment, the non-volatile memory 120 of the memory system 100 is organized using physical addresses of memory locations (sometimes referred to herein as Flash Management Units, or "FMUs"), whereas requests (e.g., received from a host) to read data from or write data to the memory 120 use logical addresses (e.g., sometimes referred to herein as logical Flash Management Units, or "LFMUs"). The memory system 100 can contain a logical-to-physical address map (e.g., stored in the memory 120) that the memory system 100 can use to map the logical address in the request to a corresponding physical address in the memory 120. In operation, the controller 110 can read the logical-to-physical address map from the non-volatile memory 120 and store it in the volatile memory (e.g., RAM 115), as reading from the volatile memory is faster and, hence, provides better performance. However, as noted in the background section above, in memory systems with many memory dies, the size of the logical-to-physical address map can be relatively large and may not be able to be stored in its entirety in the volatile memory due to resource limitations. The size of the translation table depends on the FMU resolution. For example, in a 32 GB storage system with an FMU size of 4 KB, the table size would be 32 GB/4 K or 8 MB. The table entry size may be 4 bytes, so the actual table size may be 32 MB.

Figure 3:
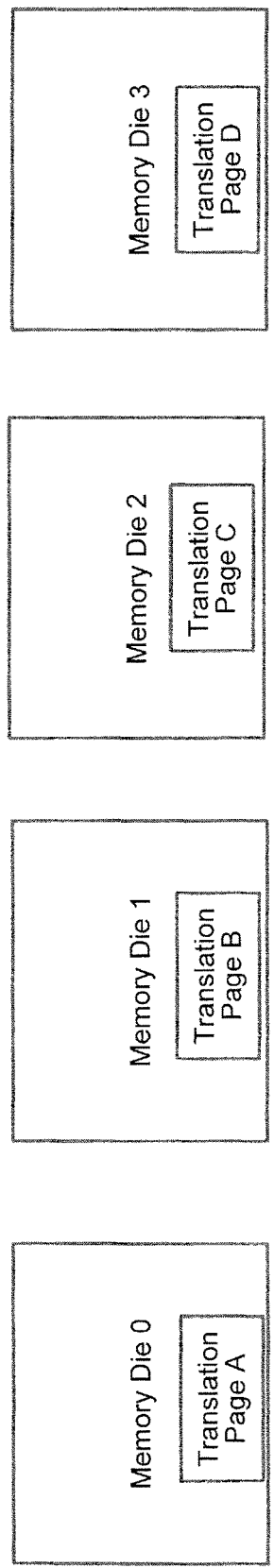
FIG. 3 is a block diagram of a plurality of memory dies of an embodiment.

Since the 32 MB table may not be resident in the RAM 115 due to resource limitations, the translation of LFMUs can be done by read operation from the memory 120, with the 32 MB table being are spread among some or all of the memory dies for write optimization. This is shown in FIG. 3, with the logical-to-physical address map being distributed among the memory dies 120, where each memory die contains a portion (sometimes referred to herein as a "translation page") of the logical-to-physical address map. The translation of a given logical address is done by reading the relevant translation page from the non-volatile memory 120 into RAM 115.

Figure 4:
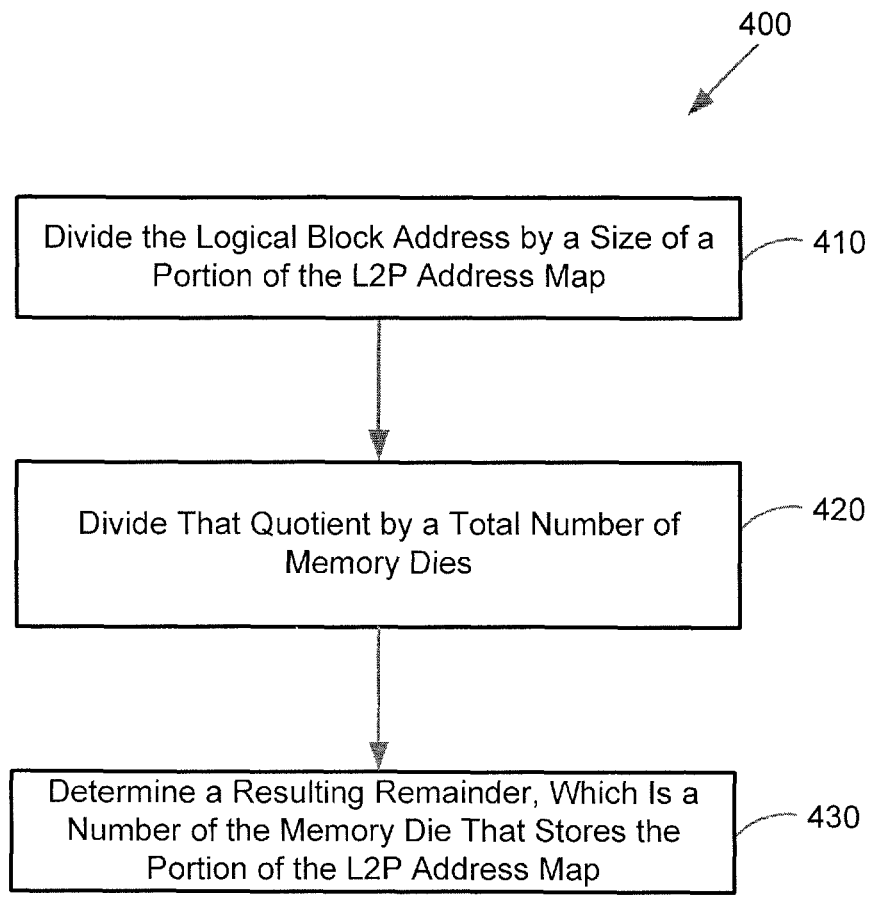
FIG. 4 is a flow chart of a method of an embodiment for determining a die number of a translation page.

Any suitable technique can be used to locate the relevant translation page from the non-volatile memory 120. One such technique is illustrated in the flow chart 400 in FIG. 4 and uses the logical block address (LFMU) as a key to know where the translation page is located in the memory dies. The translation from LBA to die number can be done using a constant function. As shown in FIG. 4, in one embodiment, the controller 110 in the memory system 100 divides the logical block address by a size of a portion of the logical-to-physical address map (act 410) and then divides that quotient by a total number of memory dies in the plurality of memory dies 120 (act 420). The controller 110 then determines the resulting remainder, which is a number of the memory die that stores the portion of the logical-to-physical address map that contains the logical block address (act 430). The first four columns in the chart in FIG. 6 show examples of this calculation, in a memory system that has 32 GB of memory across four memory dies, with a translation page size of 16 KB that maps 16 MB data (0x1000000), which equals 0x8000 in sector resolution.

Figure 5:
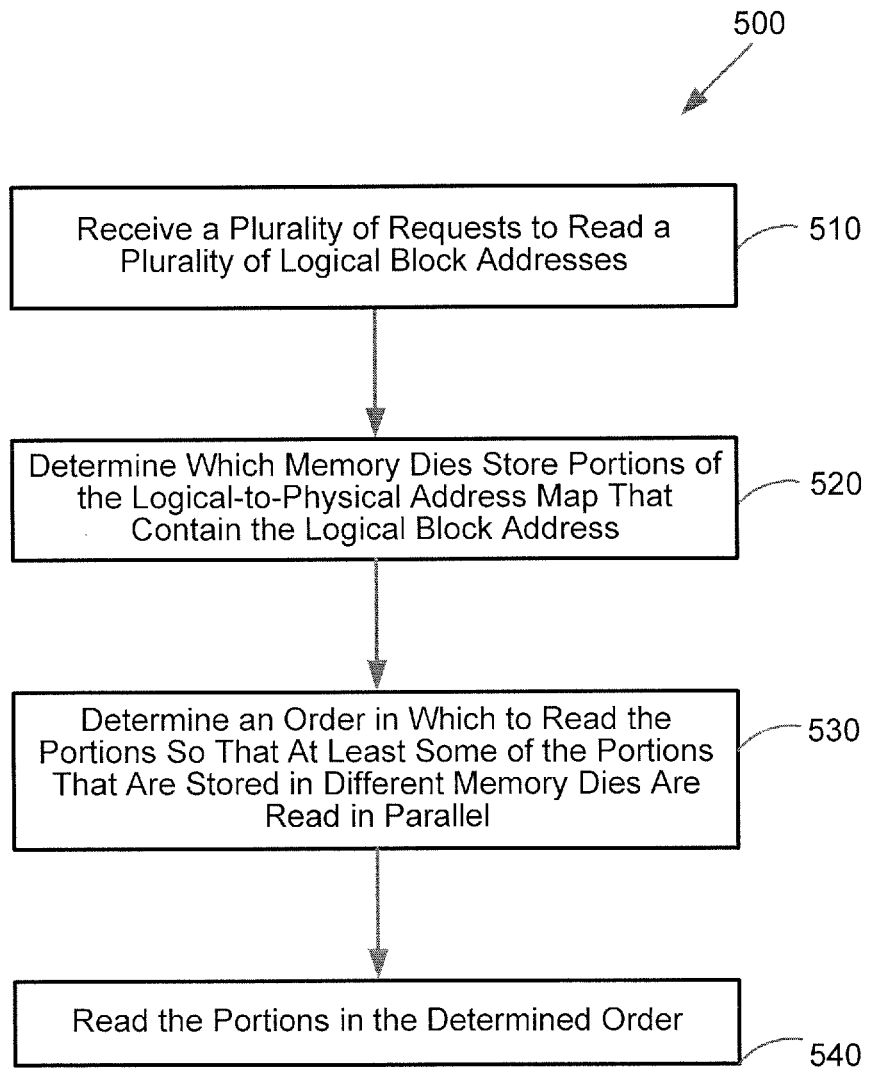
FIG. 5 is a flow chart of a method of an embodiment for increasing read parallelism of translations pages.

Knowing which dies store the translation pages can assist in increasing die parallelism for the memory system 100. This embodiment is shown in the flow chart 500 in FIG. 5. As shown in FIG. 5, the controller 110 receives (e.g., from a host) a plurality of requests to read a plurality of logical block addresses (act 510). The controller 110 then determines which memory dies store portions of the logical-to-physical address map that contain the logical block addresses (act 520). To do this, the controller 110 can use the algorithm shown in FIG. 4 or another suitable algorithm. Next, the controller 110 determines an order in which to read the portions of the logical-to-physical address map so that at least some of the portions that are stored in different memory dies are read in parallel (act 530). The controller 110 can then read the portions of the logical-to-physical address map in the determined order (act 540) and store the portion in the RAM 115, so it can be read and processed.

FIG. 6 shows the use of this method with the example discussed above, with the last column ("optimized executed order") showing the order in which the received requests can be executed to optimize die parallelism. In the example, the first four commands to be executed (as indicated in the last column) are not the first four commands that are received. The first four commands that are received require reads from dies 0, 0, 3, and 1, which means that only three dies can be read in parallel. In contrast, using the optimized order, all four dies (dies 0, 3, 1, and 2) are read in parallel, thereby allowing full parallelism of the memory 120.

If this optimization were ignored and the requests were processed in the order in which they were received, the first operation to die 2 would wait until the seventh slot, with die 2 being idle from slots 1-6. With this embodiment, command 7 is promoted to slot 4. Also, as shown in this chart, if the requests were processed in the order in which they were received, command 2 would follow command 1. However, both commands require die 0, preventing die parallelism. With the optimized order provided by this embodiment, command 2 would be postponed to the fifth slot, allowing four-die parallelism.

As can be seen by this example, one advantage of this embodiment is that the translation process can be more predictable and can be optimized in several ways to parallelize the dies. This embodiment also improves random read performance and the firmware overhead.

These embodiments can be implemented in any suitable way using any suitable technology. For example, the flow chart 700 in FIG. 7 shows one exemplary implementation in which requests are stored in a load container and, on a request-by-request basis, the controller 110 determines which memory die stores a portion of the logical-to-physical address map containing the logical block address in the request and add the request to an execution queue.

Figure 7:
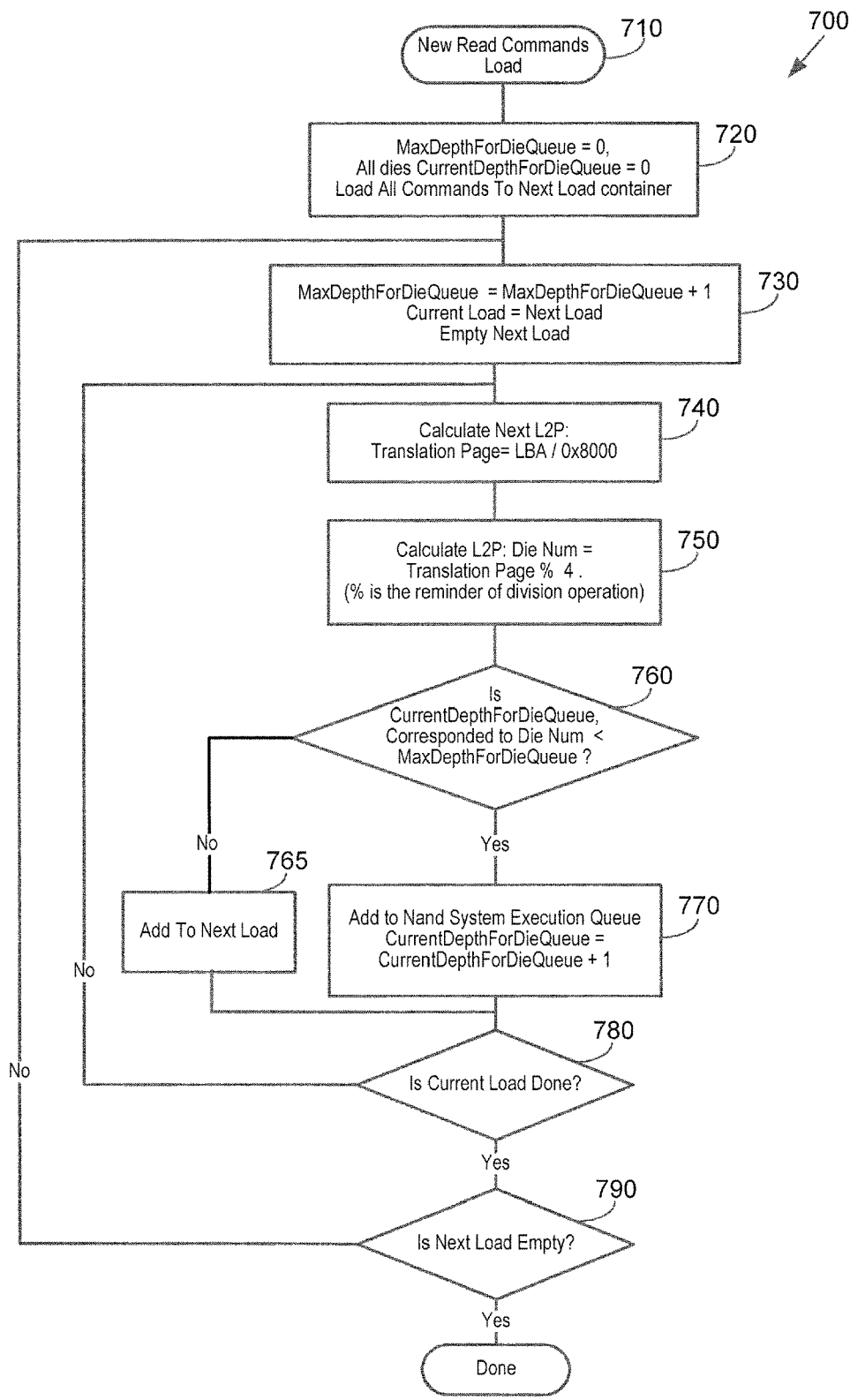
FIG. 7 is a method of an embodiment for increasing read parallelism of translations pages.

As shown in FIG. 7, the controller 110 first loads new read commands into a load container (act 710). In this embodiment, the controller 100 then sets two variables (MaxDepthForDieQueue=0 and All dies CurrentDepthForDieQueue=0) and load all commands to the next load container (act 720). Next, the controller 110 sets two other variables (MaxDepthForDieQueue=MaxDepthForDieQueue+1 and Current Load=Next Load) and empties the next load (act 730). The controller 110 then calculates the next L2P translation page (e.g., using the formula discussed above (LBA/0x8000), although others can be used) (act 740), after which the controller 110 calculates the die number (act 750). The controller 110 then determines if CurrentDepthForDieQueue, Corresponded to Die Num<MaxDepthForDieQueue (act 760). If it isn't, the controller 110 adds the command to the next load (act 765). If is it, the controller 110 adds the commend to an execution queue and set variable CurrentDepthForDieQueue=CurrentDepthForDieQueue+1 (act 770). The controller 110 then determines if the current load is done (act 780) and, if it is, if the next load is empty (act 790).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A memory system comprising:
a plurality of memory dies, wherein each memory die is configured with storage space for a portion of a logical-to-physical address map that is distributed among the plurality of memory dies, wherein the portion comprises logical addresses and physical addresses;
a volatile memory; and
a controller in communication with the plurality of memory dies and the volatile memory, wherein the controller is configured to:
receive a plurality of requests, wherein each request comprises a logical block address;
on a request-by-request basis:
determine which memory die stores a portion of the logical-to-physical address map that contains the logical block address in the request; and
add the request to an execution queue;
re-order the plurality of requests in the execution queue, wherein an order of the plurality of requests in the execution queue dictates an order in which the portions of the logical-to-physical address map will be read from the plurality of memory dies, and wherein the plurality of requests are re-ordered so that at least some of the portions that are stored in different memory dies will be read in parallel;
read the portions of the logical-to-physical address map per the re-ordering of the plurality of requests in the execution queue; and
store the read portions in the volatile memory.

2. The memory system of claim 1, wherein the controller is configured to determine which memory die stores a portion of the logical-to-physical address map that contains the logical block address by dividing the logical block address by a size of a portion of the logical-to-physical address map and then dividing that quotient by a total number of memory dies in the plurality of memory dies, wherein a resulting remainder is a number of the memory die that stores the portion of the logical-to-physical address map that contains the logical block address.

3. The memory system of claim 1, wherein at least one memory die comprises a three-dimensional memory.

4. The memory system of claim 1, wherein the memory system is embedded in a host.

5. The memory system of claim 1, wherein the memory system is removably connected to a host.

6. A method for increasing read parallelism of translations pages, the method comprising:
performing the following in a memory system having a volatile memory and a plurality of memory dies, wherein each memory die stores a translation page for logical addresses:
receiving a plurality of requests, wherein each request comprises a logical block address;
on a request-by-request basis:
determining which memory die stores a translation page containing the logical block address in the request; and
adding the request to an execution queue;
re-ordering the plurality of requests in the execution queue, wherein an order of the plurality of requests in the execution queue dictates an order in which the translation pages will be read from the plurality of memory dies, and wherein the plurality of requests are re-ordered so that at least some of the translation pages that are stored in different memory dies will be read in parallel;
reading the translation pages per the re-ordering of the plurality of requests in the execution queue; and
storing the read translation pages in the volatile memory.

7. The method of claim 6, wherein determining which memory die stores the translation page comprises dividing the logical block address by a size of the translation page and then dividing that quotient by a total number of memory dies in the plurality of memory dies, wherein a resulting remainder is a number of the memory die that stores the translation page that contains the logical block address.

8. The method of claim 6, wherein at least one memory die comprises a three-dimensional memory.

9. The method of claim 6, wherein the memory system is embedded in a host.

10. The method of claim 6, wherein the memory system is removably connected to a host.

11. A memory system comprising:
a volatile memory;
a plurality of memory dies, wherein each memory die stores a translation page for logical addresses;
means for receiving a plurality of requests, wherein each request comprises a logical block address;
means for, on a request-by-request basis:

determining which memory die stores a translation page containing the logical block address in the request; and adding the request to an execution queue;

means for re-ordering the plurality of requests in the execution queue, wherein an order of the plurality of requests in the execution queue dictates an order in which to the translation pages will be read from the plurality of memory dies, and wherein the plurality of requests are re-ordered so that at least some of the translation pages that are stored in different memory dies will be read in parallel;

means for reading the translation pages per the re-ordering of the plurality of requests in the execution queue; and means for storing the read translation pages in the volatile memory.

12. The memory system of claim 11, wherein the memory system is embedded in a host.

13. The memory system of claim 11, wherein the memory system is removably connected to a host.

14. The memory system of claim 11, wherein at least one memory die comprises a three-dimensional memory.

* * * * *